(12) United States Patent
Negri Jimenez et al.

(10) Patent No.: US 12,454,096 B2
(45) Date of Patent: Oct. 28, 2025

(54) THREE-DIMENSIONAL PRINTING WITH HYDROPHOBIZING AND HYDROPHILIZING AGENTS

(71) Applicant: PERIDOT PRINT LLC, Palo Alto, CA (US)

(72) Inventors: Graciela Emma Negri Jimenez, San Diego, CA (US); Emre Hiro Discekici, San Diego, CA (US); Jacob Wright, San Diego, CA (US); Shannon Reuben Woodruff, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 233 days.

(21) Appl. No.: 17/633,641

(22) PCT Filed: Oct. 11, 2019

(86) PCT No.: PCT/US2019/055856
§ 371 (c)(1),
(2) Date: Feb. 8, 2022

(87) PCT Pub. No.: WO2021/071510
PCT Pub. Date: Apr. 15, 2021

(65) Prior Publication Data
US 2022/0314534 A1   Oct. 6, 2022

(51) Int. Cl.
*B29C 64/165*   (2017.01)
*B29K 101/12*   (2006.01)
(Continued)

(52) U.S. Cl.
CPC ............ *B29C 64/165* (2017.08); *B33Y 10/00* (2014.12); *B33Y 70/00* (2014.12); *C09D 11/023* (2013.01);
(Continued)

(58) Field of Classification Search
CPC . B29C 64/165; B29C 64/153; B29K 2101/12; B29K 2105/0032;
(Continued)

(56) References Cited

U.S. PATENT DOCUMENTS

| 7,919,150 | B2 | 4/2011 | Morita et al. |
| 7,927,412 | B2 | 4/2011 | Kuriyama et al. |

(Continued)

FOREIGN PATENT DOCUMENTS

| DE | 102014104596 A1 * | 10/2015 | ............ B28B 1/001 |
| WO | WO-2017188963 A1 * | 11/2017 | ........... B29C 64/165 |

(Continued)

OTHER PUBLICATIONS

Hydrophobic and Hydrophilic Surfaces of 3D Printed Parts, 2018, Apium, 6 pages.

*Primary Examiner* — Xiao S Zhao
*Assistant Examiner* — Victoria Bartlett
(74) *Attorney, Agent, or Firm* — Dierker & Kavanaugh, P.C.

(57) ABSTRACT

The present disclosure describes multi-fluid kits for three-dimensional printing, three-dimensional printing kits, and methods of making three-dimensional printed articles. In one example, a multi-fluid kit for three-dimensional printing can include a fusing agent, a hydrophobizing agent, and a hydrophilizing agent. The fusing agent can include water and an electromagnetic radiation absorber, wherein the electromagnetic radiation absorber absorbs radiation energy and converts the radiation energy to heat. The hydrophobizing agent can include water and a hydrophobic additive including a first polymer having a hydrophobic group, a monomer that is polymerizable to form a first polymer having a hydrophobic group, or a combination thereof. The hydrophilizing agent can include water and a hydrophilic
(Continued)

additive including a second polymer having a hydrophilic group.

19 Claims, 4 Drawing Sheets

(51) Int. Cl.
*B29K 105/00* (2006.01)
*B33Y 10/00* (2015.01)
*B33Y 70/00* (2020.01)
*C09D 11/023* (2014.01)
*C09D 11/102* (2014.01)
*C09D 11/107* (2014.01)
*C09D 183/04* (2006.01)

(52) U.S. Cl.
CPC .......... *C09D 11/102* (2013.01); *C09D 11/107* (2013.01); *C09D 183/04* (2013.01); *B29K 2101/12* (2013.01); *B29K 2105/0032* (2013.01); *B29K 2995/0092* (2013.01); *B29K 2995/0093* (2013.01)

(58) Field of Classification Search
CPC .... B29K 2995/0092; B29K 2995/0093; C09D 11/023; C09D 11/102; C09D 11/107; C09D 11/30; C09D 11/322; C09D 11/38; C09D 183/04; B33Y 10/00; B33Y 70/00; B33Y 70/10; B33Y 40/20
See application file for complete search history.

(56) References Cited

U.S. PATENT DOCUMENTS

| 8,338,351 | B2 | 12/2012 | Kanagasabapathy et al. | |
|---|---|---|---|---|
| 2018/0015664 | A1* | 1/2018 | Kabalnov | B33Y 30/00 |
| 2018/0022025 | A1* | 1/2018 | Emamjomeh | B29C 64/393 |
| | | | | 264/308 |
| 2020/0016829 | A1* | 1/2020 | Ameloot | B33Y 10/00 |

FOREIGN PATENT DOCUMENTS

| WO | WO-2018150298 A1 | 8/2018 |
|---|---|---|
| WO | WO-2018162476 A1 | 9/2018 |
| WO | WO-2019147266 A1 | 8/2019 |
| WO | 2020/190268 A1 | 9/2020 |

* cited by examiner

THREE-DIMENSIONAL PRINTING WITH HYDROPHOBIZING AND HYDROPHILIZING AGENTS

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

DETAILED DESCRIPTION

Figure 1:
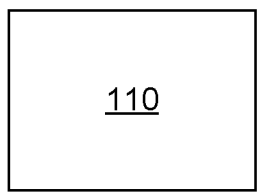
FIG. 1 is a schematic view of an example multi-fluid kit for three-dimensional printing in accordance with examples of the present disclosure.

The present disclosure describes multi-fluid kits for three-dimensional printing, three-dimensional printing kits, and methods of making three-dimensional printed articles using hydrophobizing and hydrophilizing agents. In one example, a multi-fluid kit for three-dimensional printing can include a fusing agent, a hydrophobizing agent, and a hydrophilizing agent. The fusing agent can include water and an electromagnetic radiation absorber. The electromagnetic radiation absorber can absorb radiation energy and convert the radiation energy to heat. The hydrophobizing agent can include water and a hydrophobic additive. The hydrophobic additive can include a first polymer having a hydrophobic group, a monomer that is polymerizable to form a first polymer having a hydrophobic group, or a combination thereof. The hydrophilizing agent can include water and a hydrophilic additive. The hydrophilic additive can include a second polymer having a hydrophilic group. In some examples, the hydrophobic additive can include a fluoropolymer or a trialkoxysilane monomer functionalized with a hydrophobic group. In further examples, the hydrophilic additive can include polyvinyl alcohol, polyethylene glycol, polyacrylic acid, poly(2-hydroxyethyl) methacrylate, or combinations thereof. In certain examples, the hydrophobic additive can be present in an amount from about 1 wt % to about 20 wt % with respect to the total weight of the hydrophobizing agent and the hydrophilic additive can be present in an amount from about 1 wt % to about 20 wt % with respect to the total weight of the hydrophilizing agent. In other examples, the hydrophobizing agent can include an organic co-solvent in an amount from about 10 wt % to about 40 wt % with respect to the total weight of the hydrophobizing agent and the hydrophilizing agent can include an organic co-solvent in an amount from about 1 wt % to about 10 wt % with respect to the total weight of the hydrophilizing agent. In another example, the multi-fluid kit can also include a post-processing agent including a colored dye.

The present disclosure also describes three-dimensional printing kits. In one example, a three-dimensional printing kit can include a powder bed material including polymer particles, a fusing agent to selectively apply to the powder bed material, a hydrophobizing agent to selectively apply to the powder bed material, and a hydrophilizing agent to selectively apply to the powder bed material. The fusing agent can include water and an electromagnetic radiation absorber. The electromagnetic radiation absorber can absorb radiation energy and convert the radiation energy to heat. The hydrophobizing agent can include water and a hydrophobic additive. The hydrophobic additive can include a first polymer having a hydrophobic group, a monomer that is polymerizable to form a first polymer having a hydrophobic group, or a combination thereof. The hydrophilizing agent can include water and a hydrophilic additive. The hydrophilic additive can include a second polymer having a hydrophilic group. In some examples, the polymer particles can include polyamide 6, polyamide 9, polyamide 11, polyamide 12, polyamide 66, polyamide 612, thermoplastic polyamide, polyamide copolymer, polyethylene, thermoplastic polyurethane, polypropylene, polyester, polycarbonate, polyether ketone, polyacrylate, polystyrene, polyvinylidene fluoride, polyvinylidene fluoride copolymer, poly(vinylidene fluoride-trifluoroethylene), poly(vinylidene fluoride-trifluoroethylene-chlorotrifluoroethylene), wax, or a combination thereof. In further examples, the hydrophobic additive can be present in an amount from about 1 wt % to about 20 wt % with respect to the total weight of the hydrophobizing agent and the hydrophobic additive can include a fluoropolymer or a trialkoxysilane monomer functionalized with a hydrophobic group. In other examples, the hydrophilic additive can be present in an amount from about 1 wt % to about 20 wt % with respect to the total weight of the hydrophilizing agent and the hydrophilic additive can include polyvinyl alcohol, polyethylene glycol, polyacrylic acid, poly(2-hydroxyethyl) methacrylate, or combinations thereof. In still further examples, the three-dimensional printing kit can also include a post-processing agent that includes a colored dye.

The present disclosure also describes methods of making three-dimensional printed articles. In one example, a method of making a three-dimensional printed article can include iteratively applying individual build material layers of polymer particles to a powder bed. A fusing agent can be selectively applied onto the individual build material layers based on a three-dimensional object model. The fusing agent can include water and an electromagnetic radiation absorber. A hydrophobizing agent can be selectively applied onto the individual build material layers based on the three-dimensional object model. The hydrophobizing agent can include water and a hydrophobic additive. The hydrophobic additive can include a first polymer having a hydrophobic group, a monomer that is polymerizable to form a first polymer having a hydrophobic group, or a combination thereof. A hydrophilizing agent can also be selectively applied onto the individual build material layers based on the three-dimensional object model. The hydrophilizing agent can include water and a hydrophilic additive. The hydrophilic additive can include a second polymer having a hydrophilic group. The powder bed can be exposed to energy to selectively fuse the polymer particles in contact with the electromagnetic radiation absorber to form a fused polymer matrix at individual build material layers. In some examples, the method can also include repeating the applying individual build material layers, applying the fusing agent, hydrophobizing agent, and hydrophilizing agent, and exposing the powder bed to energy in order to form a completed three-dimensional printed article having a first surface portion that includes the first polymer having a hydrophobic group and a second surface portion that includes the second polymer having the hydrophilic group. The method can also include applying a post-processing agent including a colored dye to the three-dimensional printed article such that the second portion of the surface is preferentially colored with a relatively high color saturation while the first portion of the surface remains colorless or is colored with a relatively low color saturation. In further examples, the method can include applying colored agents to the individual build material layers in order to form multiple colored portions of the completed three-dimensional printed article, and the post-processing agent can be the same color as one of the colored agents or a different color than the colored agents. In certain examples, the fusing agent can be a colorless or low tint fusing agent.

The multi-fluid kits, three-dimensional printing kits, and methods described herein can be used to make 3D printed articles that have surfaces patterned with hydrophobic and/or hydrophilic additives. Thus, certain portions of the surface of the 3D printed articles can be made more hydrophilic or hydrophobic by incorporating a hydrophobizing agent and a hydrophilizing agent during the 3D printing process. The hydrophobizing and hydrophilizing agents can include hydrophobic and hydrophilic additives, respectively, that can provide a hydrophobic or hydrophilic property to polymer particles on which the agents are applied. The hydrophobicity and hydrophilicity can be controlled at the voxel level, allowing for highly customizable patterning with high resolution. In some examples, patterning certain areas of the surface to be hydrophilic or hydrophobic can be useful for adding colorants during post-processing. For example, an aqueous dye solution can be applied to the surface of a 3D printed article and the dye can preferentially color the more hydrophilic portions of the surface while the hydrophobic portions can remain uncolored. Creating surface patterns that can easily be colored during post-processing in this way can eliminate some labor intensive post processing such as hand painting of 3D printed articles.

Additionally, in some examples colored agents may be incorporated into a 3D printed article during the 3D printing process. Colored agents can be applied selectively to form colored patterns with a high resolution at the voxel level. However, in some cases colored agents may be difficult to use without compromising other properties of the 3D printed article, such as structural strength or other properties. It may also be difficult to achieve high quality coloring such as high color density using colored agents that are applied at the voxel level during 3D printing. Therefore, the methods described herein can provide a useful additional pathway to make colored patterns on the surface of 3D printed articles that may eliminate some of the difficulties inherent in using colored agents during the 3D printing process. In certain examples, both approaches to coloring can be used together. For example, colored agents can be selectively applied during 3D printing while the hydrophobizing and hydrophilizing agents described herein can also be applied to form hydrophobic and hydrophilic patterns on the surface of the 3D printed article. Then, in post-processing, an additional colorant can be added to the surface in order to add an additional color or to increase the optical density of a color that has already been applied during 3D printing. In further examples, the hydrophobizing agent and hydrophilizing agent can also be used to adjust surface hydrophilicity and hydrophobicity for other purposes unrelated to coloring the surface of the 3D printed article.

In many examples, the fluid agents and materials described herein can be used with certain 3D printing processes that involve fusing layers of polymer powder to form solid layers of a 3D printed article. In one process, a fusing agent can be applied onto a powder bed of polymer particles. The fusing agent can include an electromagnetic radiation absorber, which can be a material that absorbs radiant energy and converts the energy to heat. Radiant energy can be applied to the powder bed to heat and fuse the polymer particles on which the fusing agent was applied. In certain examples, the fusing agent can be applied using jetting architecture such as an inkjet print head. Such a system can jet small droplets of the fusing agent at selected locations on the powder bed with a high resolution. This can allow for making high resolution, detailed 3D printed articles.

The hydrophobizing agents and hydrophilizing agents described herein can also be applied to the powder bed during the 3D printing process. These agents can also be jetted using an inkjet print head, in some examples. Therefore, detailed hydrophobic and hydrophilic patterns can be formed with high resolution. In some cases, the hydrophobizing and hydrophilizing agents can be applied at or near portions of the powder bed where a surface of the final 3D printed article is formed. As mentioned above, the hydrophobizing and hydrophilizing agents can be useful for making hydrophobic and hydrophilic patterns on surfaces of the 3D printed article. Therefore, applying the hydrophobizing or hydrophilizing agents in interior portions of the 3D printed article can be wasteful because agents printed in the interior portions may not have any effect on the surface properties of the 3D printed article. In certain examples, the hydrophobizing and hydrophilizing agents can be applied to the powder bed around the edges of individual layers or slices of the 3D printed article. These edges will become the surfaces of the final 3D printed article. In further examples, the hydrophobizing and hydrophilizing agents can also be applied slightly inside the edges (i.e., a few millimeters or less) so that the hydrophobic and hydrophilic properties can be present slightly beneath the surface of the final 3D printed article. This may facilitate penetration of aqueous solutions into the surface in the hydrophilic areas, or prevent penetration of aqueous solutions in the hydrophobic areas, for example. In still further examples, the hydrophobizing and hydrophilizing agents can be applied slightly outside the edges of the individual layers of the 3D printed article to ensure that the polymer particles present at the surface of the 3D printed article are coated or partially coated with a sufficient amount of hydrophobic or hydrophilic additives.

Multi-Fluid Kits for Three-Dimensional Printing

With this description in mind, FIG. 1 shows a schematic of an example multi-fluid kit for three-dimensional printing 100. The kit includes a fusing agent 110, a hydrophobizing agent 120, and a hydrophilizing agent 130. The fusing agent can include water and an electromagnetic radiation absorber. The electromagnetic radiation absorber can absorb radiation energy and convert the radiation energy to heat. The hydrophobizing agent can include water and a hydrophobic additive. The hydrophobic additive can include a first polymer having a hydrophobic group, a monomer that is polymerizable to form a first polymer having a hydrophobic group, or a combination thereof. The hydrophilizing agent can include water and a hydrophilic additive. The hydrophilic additive can include a second polymer having a hydrophilic group.

As used herein, "hydrophilic" can refer to any additive that, when added to a polymer surface of particles in a powder build material in the 3D printing processes described herein, tends to make the polymer surface attract water. Conversely, "hydrophobic" can refer to any additive that tends to reduce the attraction between the polymer surface of particles in a powder build material and water. In some examples, these terms can be relative one to another. Particularly, a hydrophilic additive can be a material that makes the polymer surface of particles in a powder build material more attracted to water compared to the hydrophobic additive. The initial hydrophilicity of the polymer surface of particles in a powder build material may vary depending on the composition of the polymer powder. However, in certain examples, the hydrophilic additive can increase the hydrophilicity of the polymer powder compared to the initial hydrophilicity of the polymer powder. In other examples, the hydrophobic additive can decrease the hydrophilicity of the polymer powder compared to the initial hydrophilicity of the polymer powder.

In some examples, the multi-fluid kit can also include a detailing agent. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused.

In further examples, the multi-fluid kit can also include a post-processing agent. As explained above, in some examples post-processing can include applying an aqueous solution of a colorant to the surface of the 3D printed article. The portions of the surface that include the hydrophilic additive from the hydrophilizing agent can be preferentially colored by the aqueous colorant solution while the portions of the surface that include the hydrophobic additive can remain colorless or have a less intense color. In other examples, the post-processing may be a non-aqueous composition that can be more compatible with the hydrophobic portions of the surface. Such a composition can include a colorant to preferentially color the hydrophobic portions of the surface while the hydrophilic portions remain colorless or have a less intense color. Accordingly, in certain examples, the post-processing agent can include a colored dye for coloring portions of the surface.

Figure 2:
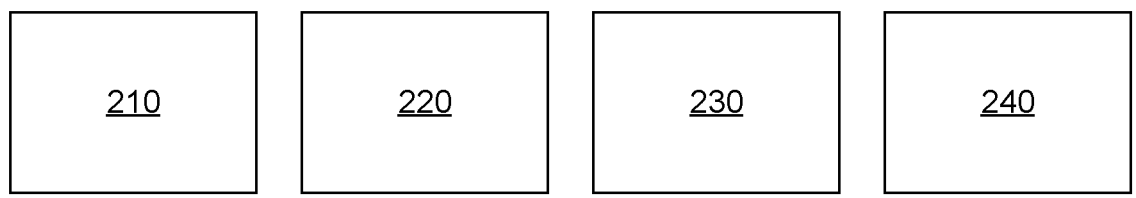
FIG. 2 is a schematic view of another example multi-fluid kit for three-dimensional printing in accordance with examples of the present disclosure.

FIG. 2 shows a schematic illustration of an example multi-fluid kit 200 that includes a fusing agent 210, a hydrophobizing agent 220, a hydrophilizing agent 230, and a post-processing agent 240. The post-processing agent can include a colored dye. In some examples, the post-processing agent can be applied by dipping the 3D printed article in the post processing agent, or by spraying the post-processing agent onto the 3D printed article, or by another method of application such as brushing. In certain examples, the 3D printed article can be washed or rinsed after the post-processing agent is applied.

Three-Dimensional Printing Kits

Figure 3:
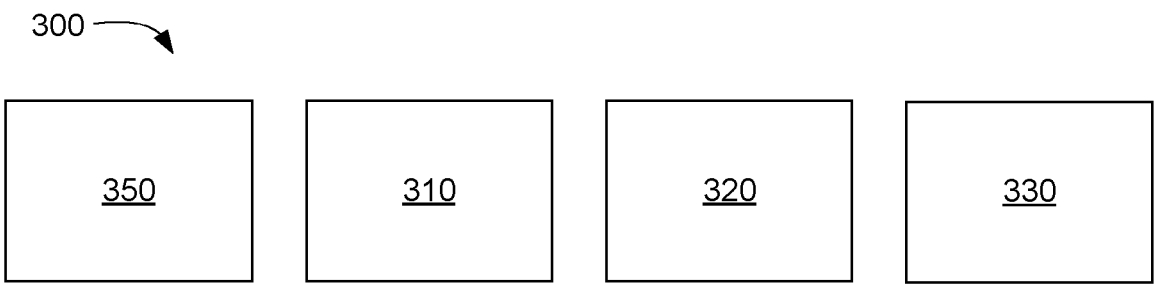
FIG. 3 is a schematic view of an example three-dimensional printing kit in accordance with examples of the present disclosure.

The present disclosure also describes three-dimensional printing kits. In some examples, the three-dimensional printing kits can include materials that can be used in the three-dimensional printing processes described herein. FIG. 3 shows a schematic illustration of one example three-dimensional printing kit 300 in accordance with examples of the present disclosure. The kit includes a powder bed material 350 including polymer particles and a fusing agent 310 to selectively apply to the powder bed material. The fusing agent can include an electromagnetic radiation absorber that can absorb radiation energy and convert the energy to heat. The kit also includes a hydrophobizing agent 320 and a hydrophilizing agent 330. The hydrophobizing agent can include water and a hydrophobic additive that includes a first polymer having a hydrophobic group, a monomer that is polymerizable to form a first polymer having a hydrophobic group, or a combination thereof. The hydrophilizing agent can include a hydrophilic additive that includes a second polymer having a hydrophilic group.

Figure 4:
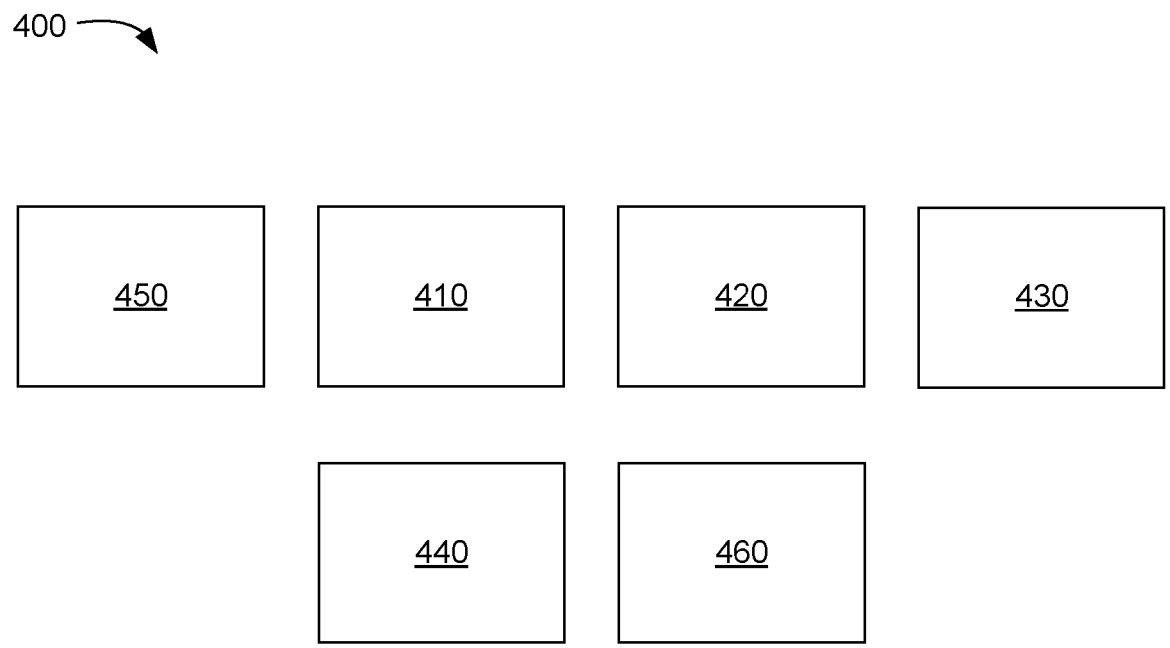
FIG. 4 is a schematic view of another example three-dimensional printing kit in accordance with examples of the present disclosure.

In further examples, a three-dimensional printing kit can include additional fluid agents, such as a detailing agent and/or a post-processing agent. FIG. 4 is a schematic illustration of one example three-dimensional printing kit 400 that includes a powder bed material 450, a fusing agent 410, a hydrophobizing agent 420, a hydrophilizing agent 430, a post-processing agent 440, and a detailing agent 460. As mentioned above, the post-processing agent can be used after the final 3D printed article has been formed. For example, the post-processing agent can be sprayed on the 3D printed article or the article can be dipped in the post-processing agent, etc. The detailing agent can be a fluid agent that can be applied during the 3D printing process in areas where it is desired to reduce the temperature of the powder bed.

While the examples shown above include both a hydrophobizing agent and a hydrophilizing agent, in some cases one of these agents can be used without the other. For example, a hydrophobizing agent can be used to make certain portions of the 3D printed article more hydrophobic without using any hydrophilizing agent on other portions. If the polymer powder bed material is somewhat hydrophilic, then the hydrophobizing agent can be used to form hydrophobic patterns that are significantly more hydrophobic than the remainder of the surface of the 3D printed article. In other examples, the polymer powder bed material can be somewhat hydrophobic and a hydrophilizing agent can be used to make relatively hydrophilic patterns on the surface of the 3D printed article. In other examples, the hydrophobizing agent and hydrophilizing agent can be used together, either by applying these respective agents to different portions of the 3D printed article, or by applying both agents together to the same portion of the 3D printed article. For example, the hydrophobizing agent and the hydrophilizing agent can both be applied to one portion of the surface of the 3D printed article, and the relative amounts of the hydrophobizing and hydrophilizing agents can be adjusted to fine tune the hydrophobicity or hydrophilicity of the surface.

Figure 5A:
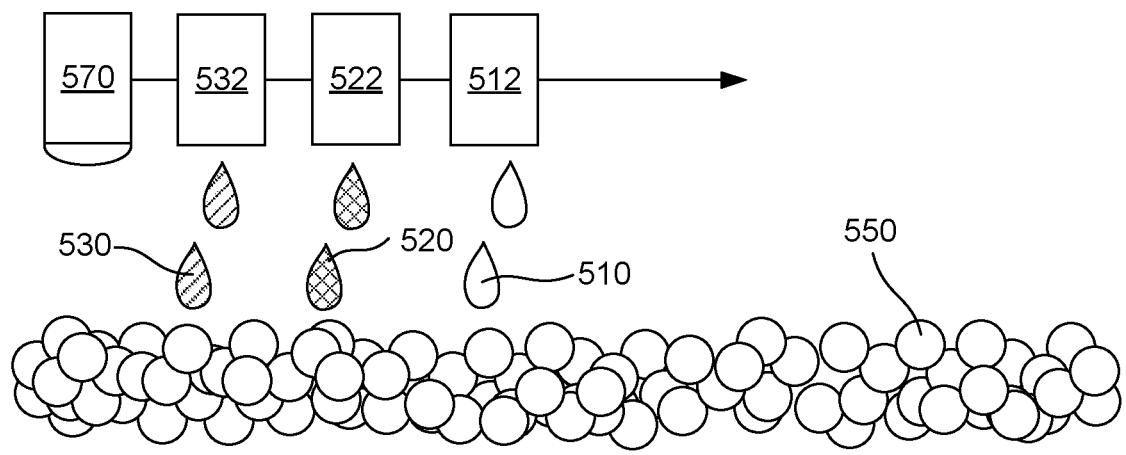
FIGS. 5A-5C show a schematic view of an example three-dimensional printing process using an example three-dimensional printing kit in accordance with examples of the present disclosure.
Figure 5B:
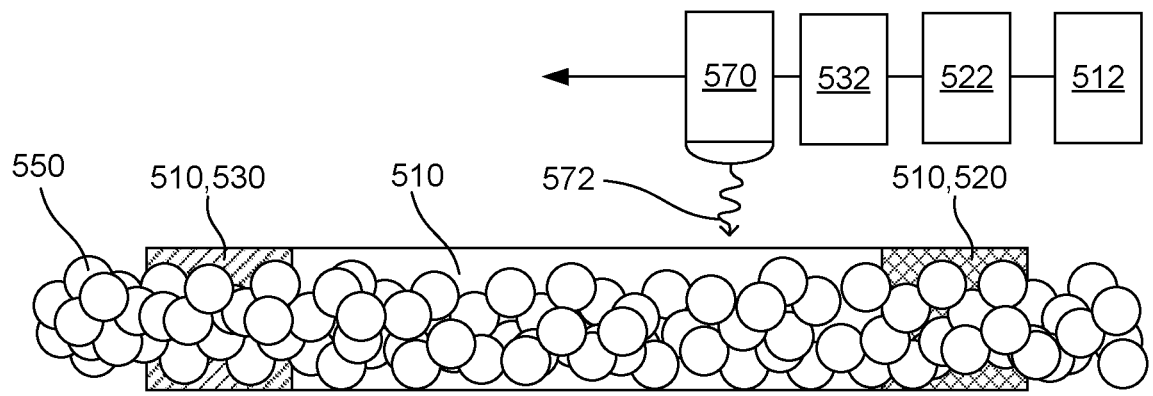
Figure 5C:
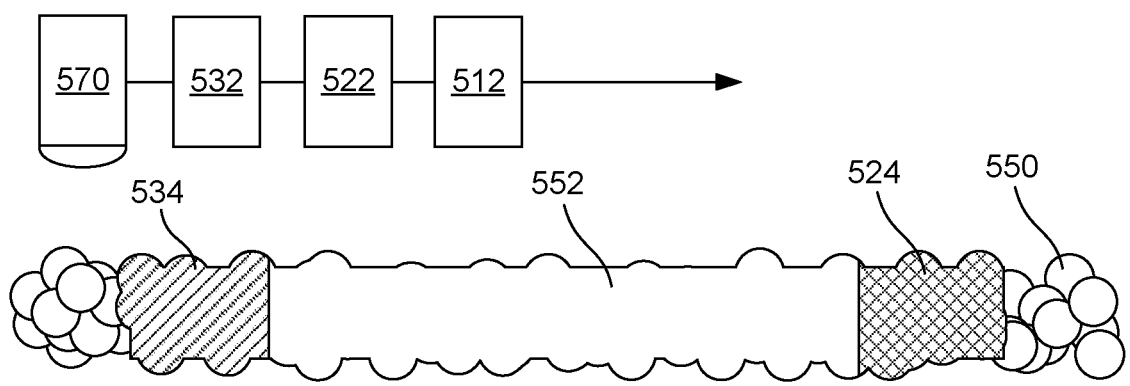

To illustrate the use of the three-dimensional printing kits and multi-fluid kits described herein, FIGS. 5A-5C illustrate one example of using a three-dimensional printing kit to form a 3D printed article. In FIG. 5A, a fusing agent 510, a hydrophobizing agent 520, and a hydrophilizing agent 530 are jetted onto a layer of powder bed material 550. The fusing agent is jetted from a fusing agent ejector 512, the hydrophobizing agent is jetted from a hydrophobizing agent ejector 522, and the hydrophilizing agent is jetted from a hydrophilizing agent ejector 532. These fluid ejectors can move across the layer of powder bed material to selectively jet fusing agent on areas that are to be fused. The hydrophobizing agent can be jetted in areas where a hydrophobic surface property is desired. Similarly, the hydrophilizing agent can be jetted in areas where a hydrophilic surface property is desired. A radiation source 570 can also move across the layer of powder bed material.

FIG. 5B shows the layer of powder bed material 550 after the fusing agent 510, hydrophobizing agent 520, and hydrophilizing agent 530 have been jetted onto an area of the layer that is to be fused. As shown in this figure, the hydrophobizing agent and hydrophilizing agent have been jetted in areas at the edge of the layer or slice of the 3D printed article that is being formed from this particular layer of powder bed material. The hydrophobizing agent has been jetted in an area along one edge, which will become a part of a hydrophobic surface in the final 3D printed article. The hydrophilizing agent has been jetted in an area along another edge, which will become a part of a hydrophilic surface in the final 3D printed article. The fusing agent has also been jetted in these areas so that these areas of the powder bed will fuse together to become part of the solid 3D printed article. The radiation source 570 is shown emitting radiation 572 toward the layer of polymer particles. The fusing agent can include a radiation absorber that can absorb this radiation and convert the radiation energy to heat.

FIG. 5C shows the layer of powder bed material 550 with a fused portion 552 where the fusing agent was jetted. This portion has reached a sufficient temperature to fuse the polymer particles together to form a solid polymer matrix. The hydrophobic additive and the hydrophilic additive from the hydrophobizing and hydrophilizing agents are incorporated into the solid polymer matrix in the areas at the edges of the layer. Therefore, the fused portion includes a hydrophobic portion 524 and a hydrophilic portion 534.

In many examples, the hydrophobizing agent and hydrophilizing agent can be applied to areas of the powder bed where the fusing agent is also applied. As mentioned above, these agents can be applied at edges of the area where the fusing agent is applied. The edges of the individual fused layers eventually become the surface of the final 3D printed article. Thus, the hydrophobizing and hydrophilizing agents can be applied to the portions of the powder bed that eventually become the surfaces of the 3D printed article. These agents can also be applied to a certain area within the edges. For example, the agents can be applied to an area beginning at the edge of the area where the fusing agent is printed, and extending inward from the edge to a certain distance. This will result in the hydrophobic or hydrophilic additive being present in the polymer matrix from the surface of the 3D printed article and down to a certain depth beneath the surface. In some examples, the hydrophobizing and hydrophilizing agents can be applied within the edges to a distance of from about 10 micrometers to about 1 millimeter within the edges. In further examples, this distance can be from about 20 micrometers to about 800 micrometers or from about 50 micrometers to about 500 micrometers.

Additionally, in some examples, the hydrophobizing agent and hydrophilizing agent can be applied to the powder bed outside the edges of the area where the fusing agent is applied. In certain examples, these agents can be applied in an area that extends from the edge or border of the area where the fusing agent is applied to a certain distance outside this border. The distance can be from about 10 micrometers to about 1 millimeter, or from about 20 micrometers to about 800 micrometers, or from about 50 micrometers to about 500 micrometers. The polymer particles in this area of the powder may not be fused and incorporated into the 3D printed article. However, it can be difficult to form a perfect edge when fusing the polymer particles, and some of the polymer particles near the edge can often become embedded in the surface of the 3D printed article. Therefore, the hydrophobizing and hydrophilizing agents can be applied to the neighboring polymer particles to ensure that the polymer at the surface of the 3D printed article has the desired amount of hydrophobic or hydrophilic additive.

Powder Bed Material

In certain examples, the powder bed material can include polymer particles having a variety of shapes, such as substantially spherical particles or irregularly-shaped particles. In some examples, the polymer powder can be capable of being formed into 3D printed objects with a resolution of about 20 µm to about 100 µm, about 30 µm to about 90 µm, or about 40 µm to about 80 µm. As used herein, "resolution" refers to the size of the smallest feature that can be formed on a 3D printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6/6 powder, polyamide 6/12 powder, thermoplastic polyamide powder, polyamide copolymer powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate, polyether ketone powder, polyacrylate powder, polystyrene powder, polyvinylidene fluoride powder, polyvinylidene fluoride copolymer powder, poly(vinylidene fluoride-trifluoroethylene) powder, poly(vinylidene fluoride-trifluoroethylene-chlorotrifluoroethylene) powder, or mixtures thereof. In a specific example, the polymer powder can be polyamide 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the polymer build material. The fusing agent can include a radiation absorber that can absorb radiant energy and convert the energy to heat. In certain examples, the fusing agent can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

In still other examples, the radiation absorber can be selected to provide that the fusing agent is a "low tint fusing agent" that may be transparent, pale in color, or white. For example, the electromagnetic radiation absorber may be transparent or white at wavelengths ranging from about 400 nm to about 780 nm. In some examples, the term "transparent" as used herein, indicates that about 20% or less of the radiation having wavelengths from about 400 nm to about 780 nm is absorbed. Thus, in examples herein, the low tint fusing agent can be white, colorless, or pale in coloration so that coloring agent can be effective in coloring the polymeric powder bed material without much, if any, interference in coloration from the radiation absorber. At the same time, the low tint fusing agent can generate heat when exposed to electromagnetic energy wavelengths from 800 nm to 4,000 nm sufficient to partially or fully melt or coalesce the polymeric powder bed material that is in contact with the low tint fusing agent.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

In further examples, the radiation absorber can include a tungsten bronze or a molybdenum bronze. In certain examples, tungsten bronzes can include compounds having the formula $M_xWO_3$, where M is a metal other than tungsten and x is equal to or less than 1. Similarly, in some examples, molybdenum bronzes can include compounds having the formula $M_xMoO_3$, where M is a metal other than molybdenum and x is equal to or less than 1.

In alternative examples, the radiation absorber can preferentially absorb ultraviolet radiation. In some examples, the radiation absorber can absorb radiation in wavelength range from about 300 nm to about 400 nm. In certain examples, the amount of electromagnetic energy absorbed by the fusing agent can be quantified as follows: a layer of the fusing agent having a thickness of 0.5 µm after liquid components have been removed can absorb from 90% to 100% of radiant electromagnetic energy having a wavelength within a wavelength range from about 300 nm to about 400 nm. The radiation absorber may also absorb little or no visible light, thus making the radiation absorber transparent to visible light. In certain examples, the 0.5 µm layer of the fusing agent can absorb from 0% to 20% of radiant electromagnetic energy in a wavelength range from above about 400 nm to about 700 nm. Non-limiting examples of ultraviolet absorbing radiation absorbers can include nanoparticles of titanium dioxide, zinc oxide, cerium oxide, indium tin oxide, or a combination thereof. In some examples, the nanoparticles can have an average particle size from about 2 nm to about 300 nm, from about 10 nm to about 100 nm, or from about 10 nm to about 60 nm.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100, Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

In certain further examples, the fusing agent can include from about 5 wt % to about 40 wt % organic co-solvent, from about 0 wt % to about 20 wt % high boiling point solvent, from about 0.1 wt % to about 1 wt % surfactant, from about 0.1 wt % to about 1 wt % anti-kogation agent, from about 0.01 wt % to about 1 wt % chelating agent, from about 0.01 wt % to about 1 wt % biocide, and from about 1 wt % to about 10 wt % carbon black pigment. The balance can be deionized water.

Hydrophobizing Agents

In some examples, the multi-fluid kits or three-dimensional printing kits can include a hydrophobizing agent. Generally, the hydrophobizing agent can include water and a hydrophobic additive. The hydrophobic additive can include a first polymer having a hydrophobic group, a monomer that is polymerizable to form a first polymer having a hydrophobic group, or a combination thereof. The hydrophobizing agent can be applied to the powder bed material during 3D printing to impart hydrophobic properties to certain portions of the 3D printed article.

In certain examples, the hydrophobic additive can include a fluoropolymer or a trialkoxysilane monomer functionalized with a hydrophobic group. Fluoropolymers that can be used can include perfluorinated polymers, polytetrafluoroethylene, perfluoroalkoxy alkanes, and combinations thereof.

In further examples, the hydrophobic additive can include a monomer that can polymerize to form a first polymer having a hydrophobic group. One type of monomer that can polymerize to form a hydrophobic polymer can include an organosilane that includes a central silicon atom bonded to a hydrocarbon group and multiple hydrolysable groups. The hydrolysable groups can be alkoxy groups or halogen atoms in some examples. In further examples, the hydrocarbon group bonded to the central silicon atom can be a C6 to C24 aliphatic or alicyclic hydrocarbon group, such as a branched or straight chain alkyl group or a cycloalkyl group. The organosilane can include one such hydrocarbon group bonded to the central silicon atom, or two such hydrocarbon groups bonded to the central silicon atom. In some examples, the hydrocarbon groups can be substituted with other atoms, such as oxygen or nitrogen, as long as the group has an overall hydrophobic character. Furthermore, two or three hydrolysable groups can be bonded to the central silicon atom. In certain examples, the organosilane can be a trialkoxysilane monomer functionalized with a hydrophobic group. In particular examples, the organosilane can be hexyltriethoxysilane or dodecyltriethoxysilane.

In some examples, the organosilanes described above can be formulated in an emulsion. An aqueous emulsion can be formed in some examples by mixing the organosilane with a surfactant in water. An acid or base can also be added in some examples. In certain examples, the surfactant can include DOWFAX™ (available from Dow, Michigan) or any of the surfactants described above in the fusing agent. In further examples, the acid can include acetic acid and the base can include sodium hydroxide.

Accordingly, in some examples, an emulsion of the organosilane can be the hydrophobic additive that is included in the hydrophobizing agent. When the hydrophobizing agent is applied to the powder bed material, the emulsion can be broken and the organosilane molecules can react together through the hydrolysable groups to form polysiloxane polymers having hydrophobic hydrocarbon groups.

The hydrophobic additive can be included in the hydrophobizing agent in an amount that is sufficient to provide a hydrophobic property to the surface of the 3D printed article. In some examples, the hydrophobic additive can be present in an amount from about 1 wt % to about 20 wt % with respect to the total weight of the hydrophobizing agent. In other examples, the hydrophobic additive can be present in an amount from about 2 wt % to about 10 wt %.

The hydrophobizing agent can also include a liquid vehicle. The hydrophobic additive can be dissolved or dispersed in the liquid vehicle. The liquid vehicle can be aqueous or non-aqueous, in various examples. Aqueous liquid vehicles can include more than 50 wt % water and can include organic co-solvent in some cases. Non-aqueous liquid vehicles can be made up entirely of an organic solvent or multiple organic solvents. In certain examples, the hydrophobizing agent can include water with an organic co-solvent in an amount from about 10 wt % to about 40 wt %. In further examples, the organic co-solvent can be present in an amount from about 15 wt % to about 30 wt %. In certain examples, the hydrophobizing agent can include a higher concentration of organic co-solvent than the hydrophilizing agent.

The hydrophobizing agent can also include ingredients to allow the hydrophobizing agent to be jetted by a fluid jet printhead. In some examples, the agent can include jettability imparting ingredients such as those in the fusing agent described above. These ingredients can include a surfactant, dispersant, co-solvent, biocides, viscosity modifiers, materials for pH adjustment, sequestering agents, preservatives, and so on. These ingredients can be included in any of the amounts described above.

In certain examples, the hydrophobizing agent can include from about 10 wt % to about 40 wt % organic co-solvent, from about 1 wt % to about 20 wt % high boiling point solvent, from about 0.1 wt % to about 2 wt % surfactant, from about 0.1 wt % to about 5 wt % anti-kogation agent, from about 0.01 wt % to about 5 wt % chelating agent, from about 0.01 wt % to about 4 wt % biocide, and the balance can be deionized water.

Hydrophilizing Agents

In some examples, the multi-fluid kits or three-dimensional printing kits can include a hydrophilizing agent.

Generally, the hydrophilizing agent can include water and a hydrophilic additive. The hydrophilic additive can include a second polymer having a hydrophilic group. The hydrophilizing agent can be applied to the powder bed material during 3D printing to impart hydrophilic properties to certain portions of the 3D printed article.

In some examples, the hydrophilic additive can be a hydrophilic polymer. Non-limiting examples of hydrophilic polymers can include polyvinyl alcohol, polyethylene glycol, polyacrylic acid, polyhydroxyethyl methacrylate, and mixtures and copolymers thereof. In certain examples, the hydrophilic polymer can include acid groups or salts thereof.

The hydrophilic additive can be included in the hydrophilizing agent in an amount that is sufficient to provide a hydrophilic property to the surface of the 3D printed article. In some examples, the hydrophilic additive can be present in an amount from about 1 wt % to about 20 wt % with respect to the total weight of the hydrophilizing agent. In other examples, the hydrophilic additive can be present in an amount from about 2 wt % to about 10 wt %.

The hydrophilizing agent can also include a liquid vehicle. The hydrophilic additive can be dissolved or dispersed in the liquid vehicle. The liquid vehicle can be aqueous or non-aqueous, in various examples. Aqueous liquid vehicles can include more than 50 wt % water and can include organic co-solvent in some cases. In certain examples, the hydrophilizing agent can include water with an organic co-solvent in an amount from about 1 wt % to about 10 wt %. In further examples, the organic co-solvent can be present in an amount from about 1 wt % to about 6 wt %. In certain examples, the hydrophilizing agent can include a lower concentration of organic co-solvent than the hydrophobizing agent.

The hydrophilizing agent can also include ingredients to allow the hydrophilizing agent to be jetted by a fluid jet printhead. In some examples, the agent can include jettability imparting ingredients such as those in the fusing agent described above. These ingredients can include a surfactant, dispersant, co-solvent, biocides, viscosity modifiers, materials for pH adjustment, sequestering agents, preservatives, and so on. These ingredients can be included in any of the amounts described above.

In certain examples, the hydrophilizing agent can include from about 1 wt % to about 10 wt % organic co-solvent, from about 1 wt % to about 10 wt % high boiling point solvent, from about 0.1 wt % to about 2 wt % surfactant, from about 0.1 wt % to about 5 wt % anti-kogation agent, from about 0.01 wt % to about 5 wt % chelating agent, from about 0.01 wt % to about 4 wt % biocide, and the balance can be deionized water.

Detailing Agents

In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In certain examples, the detailing agent can include from about 1 wt % to about 10 wt % organic co-solvent, from about 1 wt % to about 20 wt % high boiling point solvent, from about 0.1 wt % to about 2 wt % surfactant, from about 0.1 wt % to about 5 wt % anti-kogation agent, from about 0.01 wt % to about 5 wt % chelating agent, from about 0.01 wt % to about 4 wt % biocide, and the balance can be deionized water.

Methods of Making 3D Printed Articles

Figure 6:
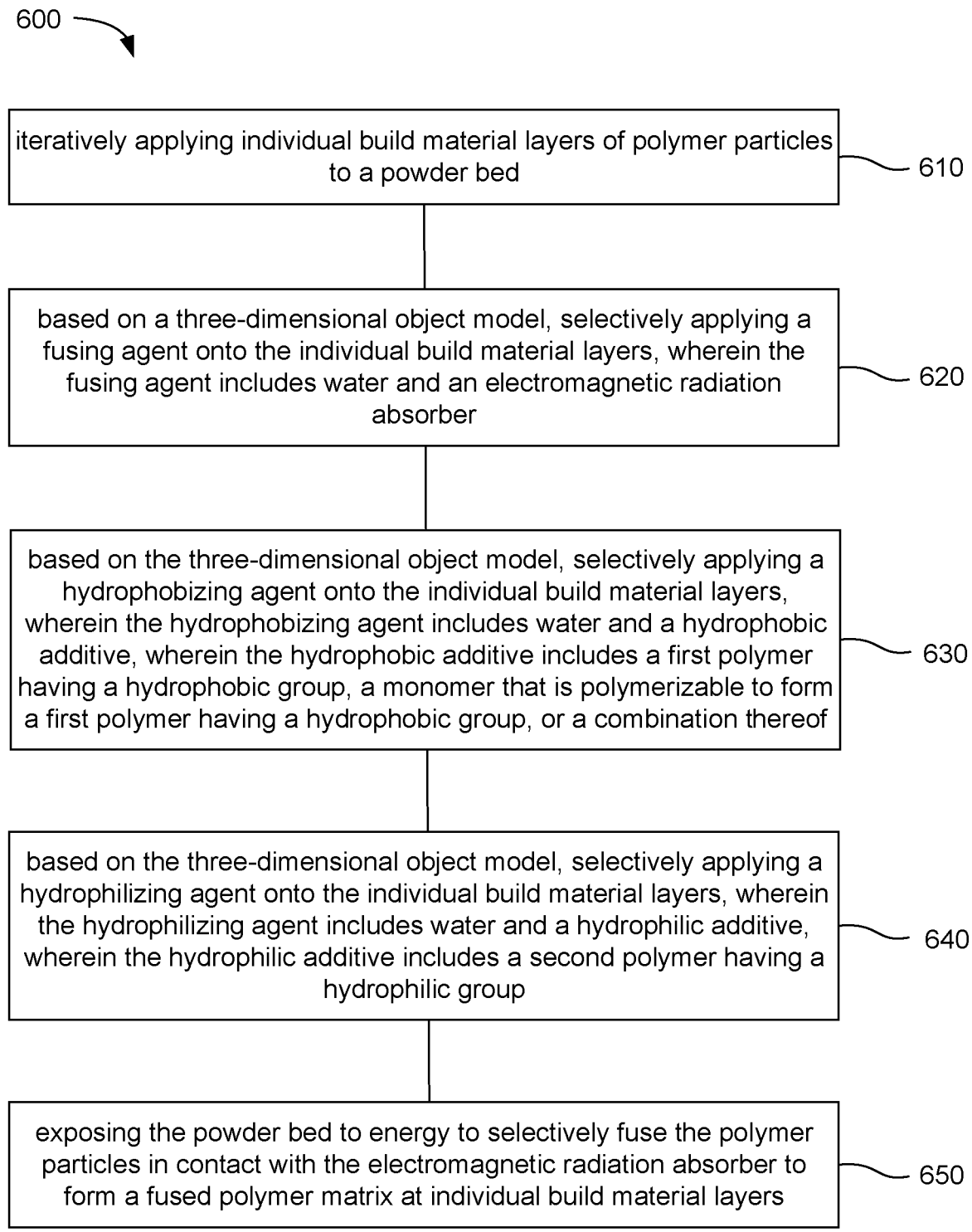
FIG. 6 is a flowchart illustrating an example method of making a three-dimensional printed article in accordance with examples of the present disclosure.

The present disclosure also describes methods of making three-dimensional printed articles. FIG. 6 shows a flowchart illustrating one example method 600 of making a three-dimensional printed article. The method includes: iteratively applying individual build material layers of polymer particles to a powder bed 610; based on a three-dimensional object model, selectively applying a fusing agent onto the individual build material layers, wherein the fusing agent includes water and an electromagnetic radiation absorber 620; based on the three-dimensional object model, selectively applying a hydrophobizing agent onto the individual build material layers, wherein the hydrophobizing agent includes water and a hydrophobic additive, wherein the hydrophobic additive includes a first polymer having a hydrophobic group, a monomer that is polymerizable to form a first polymer having a hydrophobic group, or a combination thereof 630; based on the three-dimensional object model, selectively applying a hydrophilizing agent onto the individual build material layers, wherein the hydrophilizing agent includes water and a hydrophilic additive, wherein the hydrophilic additive includes a second polymer having a hydrophilic group 640; and exposing the powder bed to energy to selectively fuse the polymer particles in contact with the electromagnetic radiation absorber to form a fused polymer matrix at individual build material layers 650.

The method of making a 3D printed article can be performed using any of the fluid agents, powder bed materials, and other components of the multi-fluid kits and three-dimensional printing kits described above. In some examples, applying individual build material layers can be repeated multiple times to form multiple layers or slices of the 3D printed article. The fusing agent, hydrophobizing agent, and hydrophilizing agent can be applied to the individual layers as desired. The areas where the hydrophobizing and hydrophilizing agents are applied can become hydrophobic and hydrophilic surfaces, respectively, in the finished 3D printed article. In certain examples, the hydrophobic portions of the surface of the 3D printed article can include the first polymer having a hydrophobic group from the hydrophobizing agent. The hydrophilic portions of the surface can include the second polymer having a hydrophilic group from the hydrophilizing agent.

In some examples, the level of hydrophobicity or hydrophilicity of the surface of the 3D printed article can be affected by several variables. For example, the initial hydrophilicity or hydrophobicity of the polymer powder bed material can impact the final properties of the surface. The 3D printing processes described herein can allow for the adjustment of the hydrophilic or hydrophobic properties of the surface by varying the amounts of hydrophilizing and hydrophobizing agent that are applied to the powder bed, the concentration of hydrophilic additive or hydrophobic additive in the agents, the level of hydrophilicity or hydrophobicity of the additives, and so on.

The methods of making a 3D printed article can also include applying a post-processing agent to the 3D printed article after printing. The post-processing agent can include a colored dye. In certain examples, the post-processing agent can be an aqueous solution of the colored dye. The post-processing solution can be applied by dipping, spraying, or another application method. When the post-processing solution is applied to the 3D printed article, the more hydrophilic portion of the surface can be preferentially colored with a relatively high color saturation. The more hydrophobic portion of the surface can remain colorless or be colored with a relatively low color saturation.

In further examples, colored agents such as colored inkjet inks can be applied to the powder bed during 3D printing to form multiple colored portions in the 3D printed article. In such examples, the post-processing agent with a colored dye can also be used to add an additional color or to increase the optical density of one of the colors already present on the 3D printed article. For example, in some cases a magenta colored agent can be used on the powder bed during 3D printing, but it can be difficult to achieve acceptable color saturation for the magenta color. The 3D printed article can be formed and then dipped in a magenta dye solution during post-processing. The particular portions of the surface where magenta color is desired can also be made hydrophilic using the hydrophilizing agents described herein. The remaining portions of the surface can be made hydrophobic using the hydrophobizing agent. Thus, the magenta dye can preferentially color the hydrophilic portions and increase the color saturation of the magenta portions.

In further examples, the 3D printing process can be performed using a colorless or low tint fusing agent. Thus, the fusing agent itself can have a minimal effect on the color of the 3D printed article. Therefore, the color of the article can be due to the use of colored agents during 3D printing and a colored post-processing agent after 3D printing.

The fusing agent, hydrophobizing agent, hydrophilizing agent, and detailing agent can be jetted onto the powder bed using fluid jet print heads. The amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be polyamide 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

The 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article. In some examples, the 3D object model can also include a particular 3D portion of the object that is desired to include the hydrophobic additive and the portion that is desired to include the hydrophilic additive. Other information may also be included, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of the hydrophobic and hydrophilic additives, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "applying" when referring to fusing agent and/or detailing agent, for example, refers to any technology that can be used to put or place the respective fluid agent on or into a layer of powder bed material for forming 3D articles. For example, "applying" may refer to "jetting," "ejecting," "dropping," "spraying," or the like.

As used herein, "jetting" or "ejecting" refers to applying fluid agents or other compositions by expelling from ejection or jetting architecture, such as ink-jet architecture. Ink-jet architecture can include thermal or piezo architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Hydrophobizing Agent

A sample hydrophobizing agent was made with the composition shown in Table 1.

TABLE 1

| Ingredient | Type | Wt % |
| --- | --- | --- |
| Silane Emulsion | Hydrophobic Additive | 5.0 |
| 2-pyrrolidone | Co-solvent | 19 |
| Tergitol ® 15-S-9 | Surfactant | 0.85 |
| Trilon ® M | Chelating Agent | 0.02 |
| Acticide ® B20 | Biocide | 0.20 |

TABLE 1-continued

| Ingredient | Type | Wt % |
| --- | --- | --- |
| Crodafos ® O3A | Anti-kogation | 0.50 |
| Trizma ® | Buffer | 0.20 |
| Water | Solvent | balance |

Tergitol ® 15-S-9 available from Dow (Michigan)
Trilon ® M available from BASF (Germany)
Acticide ® B20 available from THOR (United Kingdom)
Crodafos ® O3A available from Croda (United Kingdom)
Trizma ® available from Sigma-Aldrich (Missouri)

The silane emulsion included the following ingredients: hexyltriethoxysilane (10 wt %), DOWFAX™ surfactant (8 wt %, available from Dow, Michigan), acetic acid (1 wt %), and deionized water (81 wt %). The silane emulsion was prepared by the following process. The hexyltriethoxysilane was added slowly to a mixture of the surfactant, acetic acid, and water. The mixture was agitated for 15 to 20 minutes after the addition of the silane, and then the mixture was allowed to stand undisturbed from about 48 hours to about 72 hours at room temperature (e.g., from about 18° C. to about 22° C.).

Example 2—Hydrophilizing Agent

A sample hydrophilizing agent was made with the composition shown in Table 2.

TABLE 2

| Ingredient | Type | Wt % |
| --- | --- | --- |
| Poly(acrylic acid sodium salt) MW 1200 | Hydrophilic Additive | 4.0 |
| 2-pyrrolidone | Co-solvent | 4.0 |
| Tergitol ® 15-S-9 | Surfactant | 0.85 |
| Trilon ® M | Chelating Agent | 0.05 |
| Acticide ® B20 | Biocide | 0.18 |
| Acticide ® M20 | Biocide | 0.14 |
| Crodafos ® O3A | Anti-kogation | 0.50 |
| Trizma ® | Buffer | 0.10 |
| Water | Solvent | balance |

Tergitol ® 15-S-9 available from Dow (Michigan)
Trilon ® M available from BASF (Germany)
Acticide ® B20 available from THOR (United Kingdom)
Crodafos ® O3A available from Croda (United Kingdom)
Trizma ® available from Sigma-Aldrich (Missouri)

Example 3—3D Printed Article

A sample 3D printed article was made using an HP Multi-Jet Fusion 3D® test printer. Two fusing agents were used in the test printer. One was a black fusing agent that included a carbon pigment as the electromagnetic radiation absorber. The other was a low tint fusing agent with a very light bluish gray color. The sample hydrophobizing agent and sample hydrophilizing agent described in Examples 1 and 2 above were loaded into inkjet pens in the test printer.

The test printer was used to make a 3D printed article. The 3D article was a small, solid rectangle. The core of the article was solid polymer matrix made with the black fusing agent. The surface of the article had a layer that was formed using the low tint fusing agent in conjunction with the hydrophobizing agent and/or the hydrophilizing agent. The rectangular article was designed to have three regions of differing hydrophilicity. At the left end of the rectangle, hydrophilizing agent was applied together with the low tint fusing agent. In the central region, both the hydrophilizing agent and the hydrophobizing agent were applied with the low tint fusing agent. At the right end of the rectangle, the hydrophobizing agent was applied with the low tint fusing agent.

After the 3D article was printed, the article had the appearance of a light bluish-gray colored rectangle with no visual difference between the three regions of differing hydrophilicity. The 3D printed article was then submerged in an aqueous magenta dye solution. The article was partially dried with a paper towel and then allowed to air dry. After the article was dry, the three different hydrophilicity regions were readily apparent. The leftmost region, where the hydrophilizing agent was used, had a dark magenta color. The rightmost region, where the hydrophobizing agent was used, had a very light magenta color. The middle region, where both the hydrophilizing and hydrophobizing agents were used, had a magenta color with a saturation between the dark and light magenta colors. Clear and sharp borders between the regions were visible.

From these results, it is apparent that the surface hydrophilicity or hydrophobicity of a 3D printed article can be controlled using the hydrophilizing and hydrophobizing agents. Additionally, this property can be used to preferentially color certain portions of the surface using a post-processing agent having a colored dye. Although the hydrophobic region of the sample 3D printed article was colored with a light magenta color, it is expected that the process can be adjusted so that no substantial coloring occurs in hydrophobic areas. For example, the amount of hydrophobizing agent can be increased, or the concentration of the hydrophobic additive can be adjusted, or the concentration of dye in the post-processing agent can be adjusted, or a combination thereof.

What is claimed is:

1. A multi-fluid kit for three-dimensional printing, the multi-fluid kit comprising:
   a fusing agent comprising water and an electromagnetic radiation absorber, wherein the electromagnetic radiation absorber absorbs radiation energy and converts the radiation energy to heat;
   a hydrophobizing agent comprising water and a hydrophobic additive, wherein the hydrophobic additive is a trialkoxysilane monomer functionalized with a hydrophobic group; and
   a hydrophilizing agent comprising:
      a liquid vehicle comprising water and an additive comprising an organic co-solvent, a surfactant, a chelating agent, a biocide, an anti-kogation agent, a buffer, or a combination thereof; and
      a hydrophilic additive comprising a second polymer having a hydrophilic group.

2. The multi-fluid kit of claim 1, wherein the hydrophilic additive is selected from the group consisting of polyvinyl alcohol, polyethylene glycol, polyacrylic acid, poly (2-hydroxyethyl) methacrylate, and combinations thereof.

3. The multi-fluid kit of claim 1, wherein the hydrophobic additive is present in an amount of from about 1 wt % to about 20 wt % with respect to the total weight of the hydrophobizing agent, and wherein the hydrophilic additive is present in an amount of from about 1 wt % to about 20 wt % with respect to the total weight of the hydrophilizing agent.

4. The multi-fluid kit of claim 1, wherein the hydrophobizing agent comprises an organic co-solvent present in an amount of from about 10 wt % to about 40 wt % with respect to the total weight of the hydrophobizing agent, and wherein the organic co-solvent is present in the hydrophilizing agent in an amount of from about 1 wt % to about 10 wt % with respect to the total weight of the hydrophilizing agent.

5. The multi-fluid kit of claim 1, further comprising a post-processing agent comprising a colored dye.

6. The multi-fluid kit of claim 1, wherein the hydrophobic additive is a silane emulsion, and wherein the hydrophilic additive is a poly(acrylic acid sodium salt).

7. The multi-fluid kit of claim 1, wherein the hydrophilic additive is present in an amount ranging from about 1 wt % to 4 wt % with respect to a total weight of the hydrophilizing agent.

8. The multi-fluid kit of claim 1, wherein the hydrophobic additive is hexyltriethoxysilane or dodecyltriethoxysilane.

9. A three-dimensional printing kit, comprising:
   a powder bed material comprising polymer particles;
   a fusing agent to selectively apply to the powder bed material, the fusing agent comprising water and an electromagnetic radiation absorber, wherein the electromagnetic radiation absorber absorbs radiation energy and converts the radiation energy to heat;
   a hydrophobizing agent to selectively apply to the powder bed material, the hydrophobizing agent comprising water and a hydrophobic additive, wherein the hydrophobic additive is a trialkoxysilane monomer functionalized with a hydrophobic group; and
   a hydrophilizing agent to selectively apply to the powder bed material, the hydrophilizing agent comprising:
      a liquid vehicle comprising water and an additive comprising an organic co-solvent, a surfactant, a chelating agent, a biocide, an anti-kogation agent, a buffer, or a combination thereof; and
      a hydrophilic additive comprising a second polymer having a hydrophilic group.

10. The three-dimensional printing kit of claim 9, wherein the polymer particles are selected from the group consisting of polyamide 6 particles, polyamide 9 particles, polyamide 11 particles, polyamide 12 particles, polyamide 66 particles, polyamide 612 particles, thermoplastic polyamide particles, polyamide copolymer particles, polyethylene particles, thermoplastic polyurethane particles, polypropylene particles, polyester particles, polycarbonate particles, polyether ketone particles, polyacrylate particles, polystyrene particles, polyvinylidene fluoride particles, polyvinylidene fluoride copolymer particles, poly(vinylidene fluoride-trifluoroethylene) particles, poly(vinylidene fluoride-trifluoroethylene-chlorotrifluoroethylene) particles, wax particles, and a combination thereof.

11. The three-dimensional printing kit of claim 9, wherein the hydrophobic additive is present in an amount from about 1 wt % to about 20 wt % with respect to the total weight of the hydrophobizing agent.

12. The three-dimensional printing kit of claim 9, wherein the hydrophilic additive is present in an amount from about 1 wt % to about 20 wt % with respect to the total weight of the hydrophilizing agent, and wherein the hydrophilic additive is selected from the group consisting of polyvinyl alcohol, polyethylene glycol, polyacrylic acid, poly(2-hydroxyethyl) methacrylate, and combinations thereof.

13. The three-dimensional printing kit of claim 9, further comprising a post-processing agent comprising a colored dye.

14. The three-dimensional printing kit of claim 9, wherein the hydrophobic additive is a silane emulsion, and wherein the hydrophilic additive is a poly(acrylic acid sodium salt).

15. A method of making a three-dimensional printed article, the method comprising:
   iteratively applying individual build material layers of polymer particles to a powder bed;
   based on a three-dimensional object model, selectively applying a fusing agent onto the individual build material layers, wherein the fusing agent comprises water and an electromagnetic radiation absorber;

based on the three-dimensional object model, selectively applying a hydrophobizing agent onto the individual build material layers, wherein the hydrophobizing agent comprises water and a hydrophobic additive, wherein the hydrophobic additive is a trialkoxysilane monomer functionalized with a hydrophobic group;

based on the three-dimensional object model, selectively applying a hydrophilizing agent onto the individual build material layers, wherein the hydrophilizing agent comprises:

- a liquid vehicle comprising water and an additive comprising an organic co-solvent, a surfactant, a chelating agent, a biocide, an anti-kogation agent, a buffer, or a combination thereof; and
- a hydrophilic additive comprising a second polymer having a hydrophilic group; and exposing the powder bed to energy to selectively fuse the polymer particles in contact with the electromagnetic radiation absorber to form a fused polymer matrix at the individual build material layers.

16. The method of claim 15, further comprising:

repeating the applying individual build material layers, applying the fusing agent, hydrophobizing agent, and hydrophilizing agent, and exposing the powder bed to energy in order to form a completed three-dimensional printed article having a first surface portion comprising the first polymer having a hydrophobic group and a second surface portion comprising the second polymer having the hydrophilic group; and applying a post-processing agent comprising a colored dye to the three-dimensional printed article such that the second surface portion is preferentially colored with a high color saturation relative to the first surface portion, which is colorless or is colored with a color saturation that is lower than the high color saturation.

17. The method of claim 16, further comprising applying colored agents to the individual build material layers in order to form multiple colored portions of the completed three-dimensional printed article.

18. The method of claim 15, wherein the fusing agent is a colorless or low tint fusing agent.

19. The method of claim 15, wherein the hydrophobic additive is a silane emulsion, and wherein the hydrophilic additive is a poly(acrylic acid sodium salt).

* * * * *